United States Patent [19]
Genov et al.

[11] Patent Number: 5,775,170
[45] Date of Patent: Jul. 7, 1998

[54] ROBOTIC ARM MOTOR STABILIZER

[75] Inventors: Genco Genov, Sunnyvale; Gou-Kin Cui, Fremont, both of Calif.

[73] Assignee: Genmark Automation, Sunnyvale, Calif.

[21] Appl. No.: 592,185

[22] Filed: Jan. 26, 1996

[51] Int. Cl.$^6$ .................................................. B25J 18/00
[52] U.S. Cl. ........................ 74/490.04; 74/490.03; 411/81; 411/393
[58] Field of Search .................... 74/490.01, 490.03, 74/490.04; 901/21, 22, 23; 403/362, 315, 320; 411/81, 393

[56] References Cited

U.S. PATENT DOCUMENTS

| | | | |
|---|---|---|---|
| 3,240,513 | 3/1966 | Turzillo | 411/81 |
| 4,166,543 | 9/1979 | Dahlstrom . | |
| 4,466,307 | 8/1984 | Kouno . | |
| 4,664,587 | 5/1987 | Case, Jr. et al. . | |
| 4,693,629 | 9/1987 | Bruinsma | 403/362 |
| 4,762,459 | 8/1988 | Morita et al. . | |
| 5,064,340 | 11/1991 | Genov et al. . | |
| 5,178,512 | 1/1993 | Skrobak . | |
| 5,220,849 | 6/1993 | Lande et al. . | |

FOREIGN PATENT DOCUMENTS

| | | |
|---|---|---|
| 0 410 823 A1 | 1/1991 | European Pat. Off. . |
| 2 120 202 | 11/1983 | United Kingdom . |

*Primary Examiner*—Charles A. Marmor
*Assistant Examiner*—Troy Grabow
*Attorney, Agent, or Firm*—Burns, Doane, Swecker & Mathis LLP

[57] ABSTRACT

A robotic arm mechanism provides motion to an end effector via a motor driving a drive pulley. The drive pulley is connected by a belt structure to drive a driven pulley. The motor is mounted to a bracket. The bracket is slidably mounted to a base plate. The bracket is positioned relative to the base plate to provide desired tension in the belt structure. The bracket is fastened to the base plate by a bolt structure which extend from the base plate orthogonally to the motor. A threaded bore extends fully through the bracket from a distal mouth thereof removed from the driven pulley. The bore has an axis which is located generally in a plane which is contiguous with or parallel to the axes of the respective drive and driven pulleys. The bore extends from an opening facing the distal side downwardly to the base plate and towards the axis of the driven pulley. A set screw is engaged with the bore and extends through it such that the screw's tip forcibly engages with the base plate.

6 Claims, 2 Drawing Sheets

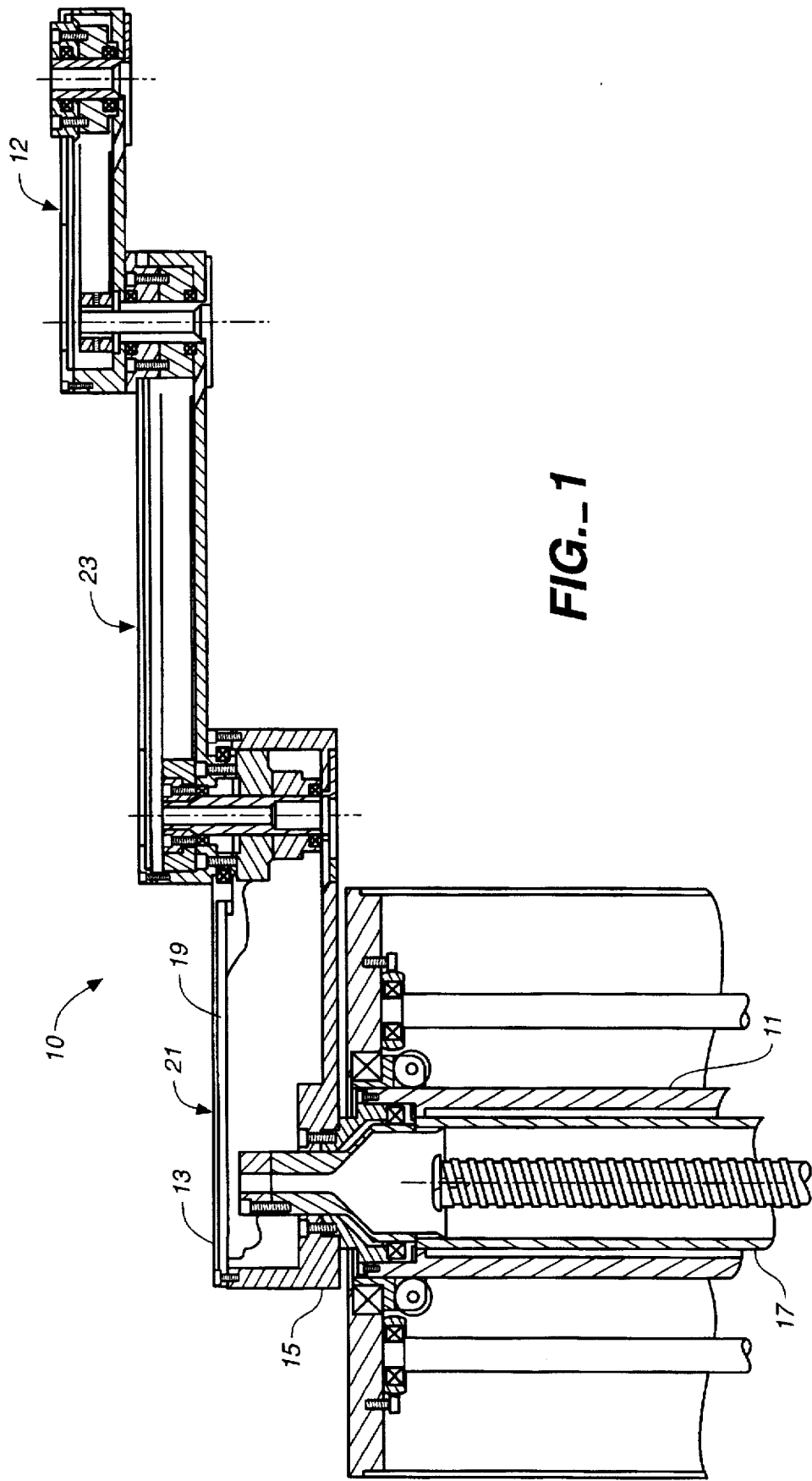

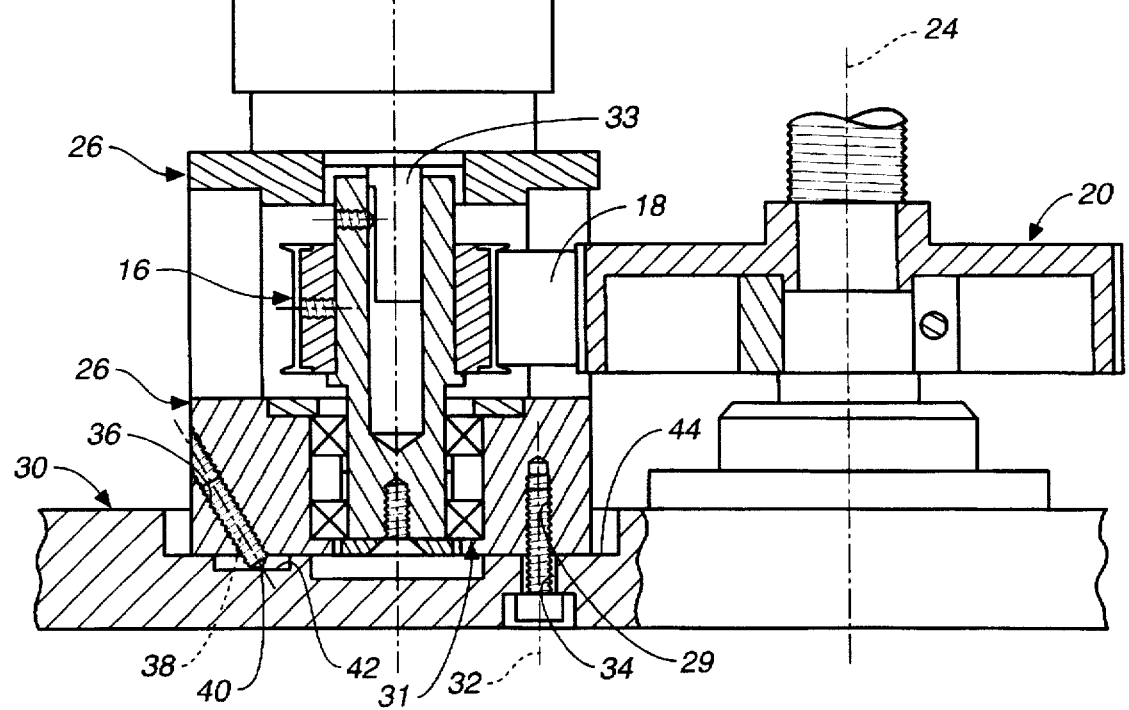
FIG._2

ROBOTIC ARM MOTOR STABILIZER

TECHNICAL FIELD

The present invention relates to a precision arm mechanism which will extend and retract in a straight line and is suitable for positioning various objects such as semiconductor wafers, cassettes holding such wafers, computer hard discs, flat panel displays, reticles, CD ROMs, ceramic substrates and the like for processing and/or use. More particularly, the invention relates to a structure for maintaining high tension in the belts which are used to transmit power from the motors of such a system to the pulleys which drive the components of the arm mechanism.

BACKGROUND OF THE INVENTION

The use of robot arms for positioning and placing objects is well known. Generally, the arms have Z-, R- and θ-motion in a conventional cylindrical coordinate system. The capability of providing straight line motion is very important in the processing of semiconductor wafers so as to allow them to be very accurately positioned at a workstation where processing steps take place. The R or straight line movement of the end effector or mechanical hand at the end of the arm has been accomplished in a number of manners.

Commonly, two link arms with equal length links have been utilized to accomplish the straight line motion. The links are connected to each other so that distal end of the first link is pivotally attached to the proximal end of the second link. The links utilize belt drives which are provided for coordinately rotating the second link to the first link to provide a rotation ratio, $i_{2,1}$ of 2/1, and to provide a rotation ratio, $i_{3,2}$ of 1/2 between the end effector and the distal link of the robotic arm. When $i_{2,1}$ is equal to 2/1 and $i_{3,2}$ is equal to 1/2, the result is that $i_{3,1}$, the rotation ratio of the end effector relative to the first link, is equal to $2/1 \times 1/2$ or unity and straight line motion results. In the case of 3 link arms, such as those shown in U.S. Pat. No. 5,064,340 (which is incorporated herein by reference), the rotation ratio between the third and second links is 1/1 and other ratios are as just discussed above. In this situation $i_{2,1}$ is equal to 2/1, $i_{3,2}$ is equal to 1/1 and $i_{4,3}$ is equal to 1/2. This assures that $i_{4,1}$ is equal to unity and straight line motion results.

θ- motion and Z- motion are also needed to provided the ability to position the arm to move workpieces, generally semiconductor wafers, from cassettes to workstations for processing and from one workstation to another and for positioning heavier objects. Each of the motions, R- motion, θ- motion and Z- motion, is generally provided by motors which are connected via belt and pulley arrangements to deliver power from a motor to a driven element. The belts must be kept under high tension if the end effector is to be movable with the extremely high precision needed for this type of apparatus. In the past, the tension has been maintained by providing a motor which is movable towards or away from the driven pulley with the motor being fastened in the desired position utilizing a bolt which mounts the motor to a base plate, usually via a bracket mounted between and to the base plate and the motor. Because of the vibration of the motor and possible deterioration of certain belts this has been recognized as being insufficient to assure high tension over a long period of time and posts have been rigidly mounted to the base plate on the opposite (distal) side of the motor from the driven pulley. Bolts have then been attached between the posts and the motors (or motor mounting brackets) to bias the motors toward the posts. While this works adequately it takes up space in that it requires that the posts be present and they are outboard (distal) of the motor. In semiconductor processing space is at a premium whereby this is undesirable.

DISCLOSURE OF INVENTION

The present invention is directed to overcoming one or more of the problems set forth above.

In accordance with an embodiment of the invention an improvement is set forth in a robotic arm mechanism which provides motion to an end effector. The motion is provided by a motor driving a drive pulley. The drive pulley is connected by belt means to drive a driven pulley. The motor is mounted to a bracket. The bracket is slidably mounted to a base plate. The bracket is positioned relative to the base plate to provide desired tension in the belt means. The bracket is fastened to the base plate by bolt means which extend from the base plate orthogonally to the motor. The improvement, comprising a threaded bore extending fully through the bracket from a distal side thereof removed from the driven pulley. The bore has an axis which is located generally in a plane which is contiguous with or parallel to the axes of the respective drive and driven pulleys. The bore extends from an opening facing the distal side downwardly to the base plate and towards the axis of the driven pulley. A set screw is engaged with the bore and extends through it such that the screw's tip forcibly engages with the base plate.

In this manner the belt tension can be maintained over relatively long periods of use even though the motor is subjected to continuing and substantial vibration during operation of the robotic arm mechanism. Most importantly, this is accomplished without increasing the lateral dimension of the motor/driven pulley combination. This allows the apparatus to be used in situations in which space is at a premium and extreme accuracy is essential such as semiconductor wafer processing operations.

BRIEF DESCRIPTION OF THE DRAWINGS

The invention will be better understood by reference to the figures of the drawings wherein like numbers denote like parts throughout and wherein:

FIG. 1 illustrates, in partial side section, a robotic arm mechanism useful for positioning semiconductor wafers, other workpieces, etc.; and FIG. 2 illustrates, in side partially sectioned view, a motor stabilized in accordance with an embodiment of the invention.

DETAILED DESCRIPTION OF INVENTION

For a better understanding of the invention it should be noted that the terms "belt" and "belt means" are used broadly to include toothed and untoothed constructions, chains, fabric belts, woven belts and the like. They may be constructed of any suitable material, natural or synthetic, organic, inorganic, polymeric, composite or metallic. Likewise the terms "pulley" and "pulley means" are used broadly to include toothed and untoothed constructions, constructions which positively engage with respective belts or which engage only frictionally with such belts. They too may be constructed of any suitable material, natural or synthetic, organic, inorganic, polymeric, composite or metallic. With this in mind the following detailed discussion of the invention will be set forth.

FIG. 1 illustrates a robotic arm mechanism 10 which provides R-, Z- and θ- motion to an end effector 12. The mechanism is useful for positioning semiconductor wafers in a multistep wafer processing operation. The θ- motion is provided by rotation of larger hollow shaft 11 which rotates θ- axle 15. The R- motion is provided by rotation of smaller coaxial hollow shaft 17 with which pulley 13 rotates. Belt means (not shown) drive pulley 19 and R- motion is provided in a conventional manner via coordinating lengths and rotations of links 21, 23 and end effector 12.

R-, Z- and θ- motion of the end effector 12 is generally provided by respective R-, Z- and θ- motors 14, one of which is illustrated in FIG. 2. The invention can be utilized on one, two or all three such motors. The motor 14 has a drive pulley 16 which is driven by it and which drives, via belt means 18, a driven pulley 20 which in turn provides the desired R-, Z- or θ- motion of the end effector 12. The R- and θ-motion is provided by direct or indirect (via gearing, etc.) rotation of the shafts 17 and 13, respectively. For Z- motion the driven pulley 20 normally drives a lead screw and a bracket, which rides up/down on the lead screw, is attached to provide the Z- motion. The drive pulley 16 is rotated by the motor 14 about the axis 22 and the driven pulley 20 rotates about the axis 24. The axes are parallel to one another. It is essential to proper operation of the arm mechanism 10 that the belt means has sufficient tension so that the drive pulley 16 drives the driven pulley 20 in a very positive manner and that the tension is maintained over long periods of time. If this is not the case the result is the development of sloppiness in the motion of the arm mechanism 10. This will lead to improper processing of the wafers and resulting loss in throughput.

As is shown in FIG. 2, the motor 14 is mounted to a bracket 26 which has a wall structure 28 which sit upon a base plate 30. The base plate 30 is generally made of aluminum and is, hence, relatively soft as compared with steel. The bracket 26 which is illustrated is in the form of an inverted can defined by the circular wall 28 has bores 29 (one is shown) extending upwardly into it in which bolts 32 are engaged. Bearings 31 can advantageously be supported by the bracket 26 to bearingly support the end of a drive shaft 33 which extends from motor 14. Bolts 32 pass upwardly through longitudinally extending slots 34 in the base plate 30. The slots 34 extend along a plane defined by the axes 22 and 24. The slots 34 allow for adjustment of the tension in the belt means 18. Basically, with the belt means 18 in place the bracket 26 can be moved away from the pulley 20 until sufficient tension is present in the belt means 18. Then, the bolts 32 can be advanced into the bores 29 and tightened thereby fastening the bracket 26 firmly against the base plate 30. What results, for the moment, is the desired tension in the belt means 18.

As the arm mechanism is used the end effector is moved repeatedly and rapidly about under the impetus of the motor 14 operating via the belt means 18. The repeated movement and the accompanying vibration can lead to a slow movement of the motor 14 toward the axis 24 as the bolts 32 loosen. This, in turn, leads to a reduction in the tension in the belt means 18. The present invention overcomes this problem in the manner set forth in following.

A threaded bore 36 is formed in the bracket 26. In the particular embodiment illustrated the bore 36 is formed in the distal most portion of the wall 28 from the axis 24 of the driven pulley 20 but other locations can be utilized. The bore 36 extends into the bracket 26 from a direction removed from the axis 24 and proceeds downwardly to the base plate 30 and towards the axis 24. The precise angle between the bore 36 and the base plate 30 is a matter of design choice. Suitably it is between 30° and 60°. An angle of 45° is very suitable. The bore 36 is in a plane which is contiguous with or parallel to the plane defined by the axes 22 and 24. A mating set screw 38 having a tip 40 screws into the bore 36. The tip 40 extends from a lower end of the bore 36 into forcing engagement with the base plate 30. This serves to preclude movement of the motor 14 caused by vibration of the arm mechanism 10 whereby the tension in the belt means 18 can be maintained for relatively long periods of time. The screw 38 is suitably made of a material which is harder than the material of the base plate 30 (generally of steel) which allows the tip 40 to dig into the base plate 30. Note that all of this is accomplished without increasing the lateral dimension of the apparatus outwardly from the motor 14 whereby a minimum amount of space is taken up by the apparatus.

Preferably, the base plate 30 defines a recess at 42 into which the tip 40 of the set screw 38 fits. This serves to prevent a top facing surface 44 of the base plate 30 from being scratched or dug into. This is advantageous in that burrs, etc. are not formed which might make misalignment of a replacement motor/bracket combination or other components likely to occur.

INDUSTRIAL APPLICABILITY

The present invention provides a robotic arm structure 10 useful for a number of things, particularly for positioning semiconductor wafers for processing. In particular, the invention provides a robotic arm structure which has a simple structure to assure tension retention in belt means 18 without laterally extending the size of the apparatus.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a robotic arm mechanism providing motion to an end effector, the motion being provided by a motor driving a drive pulley, the drive pulley rotating about a first axis being connected by belt means to drive a driven pulley, the driven pulley having a second axis, the motor being mounted to a bracket, the bracket being slidably mounted to a base plate, the bracket being positioned relative to the base plate to provide desired tension in the belt means, the bracket being fastened to the base plate by bolt means which extend from the base plate orthogonally to the motor, a belt means tensioning improvement, comprising:

a threaded bore extending fully through the bracket from a distally facing end thereof removed from the driven pulley to a proximal end thereof, closer to the driven pulley, the bore having a third axis which is located generally in a plane which is contiguous with or parallel to the axes of the respective drive and driven pulleys, the bore extending to the base plate, and towards the axis of the driven pulley; and a set screw having a tip, the screw being engaged with the bore and extending therethrough such that the tip forcibly engages with the base plate.

2. A robotic arm mechanism as set forth in claim 1, which provides R- motion, Z- motion and θ- motion to the end effector, each of the motions being provided by a respective R- motor, Z- motor and θ- motor driving a respective R- drive pulley, Z- drive pulley and θ- drive pulley, the drive pulleys each being connected by a respective R- belt means, Z- belt means and θ- belt means to drive a respective R- driven pulley, Z- driven pulley and θ- driven pulley, each motor being mounted to a respective bracket, each bracket being slidably mounted to a base plate, the brackets being positioned relative to the base plate to provide desired tension in the respective belt means, each of the brackets being fastened to the base plate by bolt means which extend from the base plate orthogonally to the respective motor, wherein the brackets of each of the motors includes the belt means tensioning improvement of claim 1.

3. A robotic arm mechanism as set forth in claim 2, wherein the base plate includes a recess and the tip of the screw forcibly engages the base plate in the recess.

4. A robotic arm mechanism as set forth in claim 3, wherein the recess extends away from the axes of the drive pulley and the driven pulley.

5. A robotic arm mechanism as set forth in claim 1, wherein the base plate includes a recess and the tip of the screw forcibly engages the base plate in the recess.

6. A robotic arm mechanism as set forth in claim 5, wherein the recess extends away from the axes of the drive pulley and the driven pulley.

* * * * *